F. W. HUNT & W. A. WHITEHOUSE.
LUNCH-BOX.
No. 170,441. Patented Nov. 30, 1875.
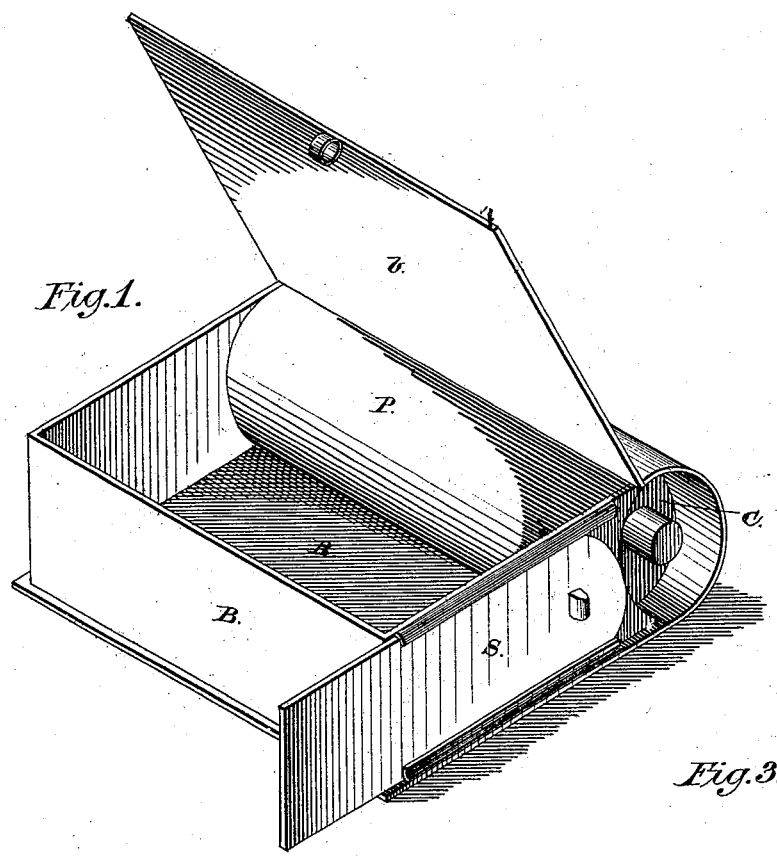
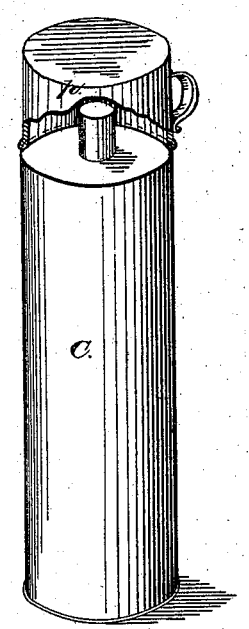
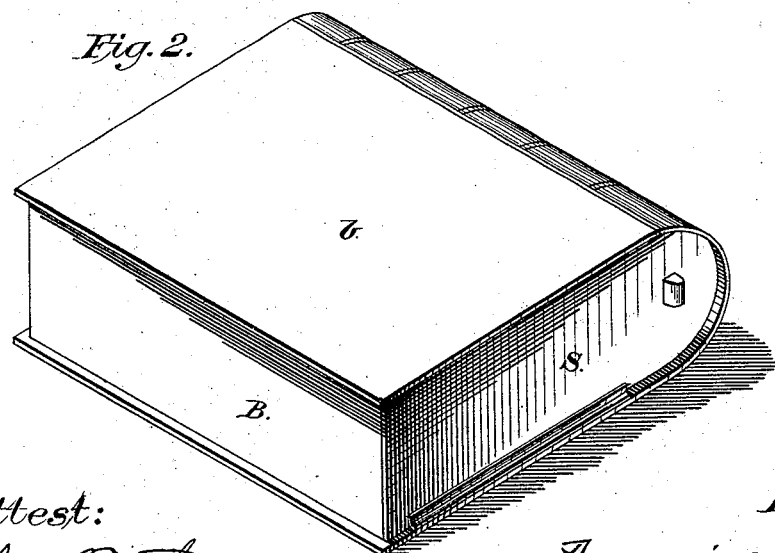
Attest:
Inventors:

UNITED STATES PATENT OFFICE.

FRANCIS W. HUNT, OF EAST ORANGE, AND WILLIAM A. WHITEHOUSE, OF NEWARK, NEW JERSEY.

IMPROVEMENT IN LUNCH-BOXES.

Specification forming part of Letters Patent No. 170,441, dated November 30, 1875; application filed March 3, 1875.

*To all whom it may concern:*

Be it known that we, FRANCIS W. HUNT, of East Orange, and WILLIAM A. WHITEHOUSE, of Newark, in the county of Essex and State of New Jersey, have invented certain new and useful Improvements in Lunch-Boxes; and we do hereby declare that the following is a full, clear, and exact description thereof, sufficient to enable those skilled in the art to which our invention appertains to make and use the same, reference being had to the accompanying drawings, and to the letters of reference marked thereon, which form a part of this specification.

Our invention relates to improvements in that class of lunch-boxes representing an album or book; and it consists in constructing the back with a cylindrical shell or tube, which is adapted to receive a cylindrical vessel for carrying liquids, all as will hereinafter be more fully described, and pointed out in the claim.

Referring to the drawings, Figure 1 is a perspective view of our invention, with the lid in a raised position. Fig. 2 is a similar view, with the lid closed. Fig. 3 is also a perspective view of the vessel for carrying liquids.

Similar letters of reference occurring on the several figures indicate corresponding parts.

B represents a lunch-box, of the album or book form, constructed, preferably, of sheet metal, and provided with a lid, $b$, the back of said box being formed with a sheet-metal cylinder, P, closed at one end and open at the other. At one end of the box B is attached, in suitable grooves, a metallic slide, S, which is adapted to cover the opening in the end of the cylinder P, said slide being provided with a projecting knob or lug to more readily operate the same, as shown in Fig. 1. C represents a cylindrical vessel for carrying liquids, and is provided with a spout or mouth-piece for pouring out the same, said vessel being also provided with a cup, $p$, as shown in partial section in Fig. 3. This cup is adapted to rest upon the upper part of the cylindrical vessel C, when placed in the receptacle P, thereby keeping both articles in a secure position in said receptacle when the slide S is closed.

The object of our said invention, as will be readily observed upon a glance at the accompanying drawing, is to provide a lunch-box with a suitable vessel for carrying coffee, tea, milk, or other liquid, in connection with the more solid articles of food intended to be placed in the main body of the box, and, as now improved, is the embodiment of simplicity, cheapness, and durability, and ready adaptation to the purpose intended.

Having thus described our invention, what we claim as new, and desire to secure by Letters Patent, is—

As an improved article of manufacture, the herein-described lunch-box, consisting of the receptacle B, provided with the compartment P, adapted to receive the cylindrical vessel C and cup $p$, and covered by the slide S, substantially as described and shown.

FRANCIS W. HUNT.
WILLIAM A. WHITEHOUSE.

Witnesses:
E. E. BOND,
CHAS. TUTTLE.